US005569910A

United States Patent [19]
Griesemer

[11] Patent Number: 5,569,910
[45] Date of Patent: Oct. 29, 1996

[54] PHOTODETECTOR SYSTEM FOR DETECTING OBSTACLES IN AISLES BETWEEN MOBILE SHELVING CARRIAGES

[75] Inventor: Patrick J. Griesemer, Franklin, Wis.

[73] Assignee: Spacesaver Corporation, Fort Atkinson, Wis.

[21] Appl. No.: 338,006

[22] Filed: Nov. 10, 1994

[51] Int. Cl.$^6$ ............................................ G01V 9/04
[52] U.S. Cl. ................... 250/221; 250/222.1; 250/341.1; 312/201
[58] Field of Search ............................. 250/214 R214.1, 250/221, 222.1, 341.1, 559.4; 312/198, 200, 201

[56] References Cited

U.S. PATENT DOCUMENTS

| | | | |
|---|---|---|---|
| 4,677,294 | 6/1987 | Spector et al. | 250/342 |
| 4,761,562 | 8/1988 | Christensen et al. | 250/223 R |
| 5,121,975 | 6/1992 | Dahnert | 312/201 |
| 5,359,191 | 10/1994 | Griesemer et al. | 250/222.1 |
| 5,408,089 | 4/1995 | Bruno et al. | 250/221 |
| 5,427,444 | 6/1995 | Griesemer | 312/201 |

Primary Examiner—Stephone Allen
Attorney, Agent, or Firm—Ryan, Maki, Mann & Hohenfeldt

[57] ABSTRACT

Obstacles are protected against collision in aisles adjacent mobile storage units with an IR transmitter mounted in spaced apart relation to an IR receiver on a unit. For initializing and calibrating the system a microcomputer controls the transmitter to emit IR pulses of increasing width at a uniform repetition rate. If there is no defect in the system the receiver responds with output electric pulses after the IR pulse width is reached that has the minimum integrated energy to exceed the input signal threshold of the receiver. The minimum energy pulse width is stored in the microcomputer and the system switches to a run mode allowing storage units to move when commanded. The computer responds to the absence of returned pulses from the receiver by inhibiting the system so the mobile unit will not run. If returned pulses are not in the proper phase relationship the system goes into a diagnostic mode wherein the interval between transmitted IR pulses is reduced in increments for reasons including determining if there may only be temporary ambient IR interference. If the problem does not clear up by the time the interval is reduced to one-half normal interval the system locks out.

18 Claims, 3 Drawing Sheets

PHOTODETECTOR SYSTEM FOR DETECTING OBSTACLES IN AISLES BETWEEN MOBILE SHELVING CARRIAGES

BACKGROUND OF THE INVENTION

The invention disclosed herein pertains to a method and apparatus for detecting a person or object in an aisle between mobile storage units and for automatically stopping movement of the unit before a collision with a person or object occurs.

Mobile storage units are well-known and are described in many patents including U.S. Pat. No. 4,557,534, which is owned by the Assignee of this application. A mobile storage unit comprises a carriage that supports shelving and is driven bidirectionally on tracks by a motor mounted on the carriage. Such units are used in libraries, archival record rooms, storage rooms, and offices for storing records, documents and books and mobile units are frequently used in warehouses and industrial plants for storing parts and finished products. One of several meritorious features of mobile units is that they conserve floor space by reason of requiring only one aisle to be open between any two units at one time, since all other units on the same tracks or rails are driven into abutting relation with no aisle space between them.

If an object or person is in an open aisle at a time when another person attempts to open a different aisle the movement of all units will be arrested by the primary safety protective system herein proposed. A conventional way of achieving this safety objective has been to mount a swingable sweep bar near the bottom of each mobile unit and extending over the width of the unit. If the sweep bar is pressed by a moving unit pushing an object against it, or if it is pressed by the foot of a person in an aisle who observes a mobile unit moving toward him or her, the sweep bar activates switches that disable the carriage drive motors.

Supplanting sweep bars with photoelectric systems has advantages as explained in U.S. Pat. No. 5,121,975, which is owned by the Assignee of this application. In the patented system, analog electric circuitry is used. A light beam transmitter is mounted on the aisle side of a mobile unit near one end of the unit, and a photosensitive receiver is mounted remotely near the opposite end of the unit. The beam of light transmitted by the transmitter is focused on the photosensitive receiver. If the light beam is interrupted by a person or an object, electronic circuitry responds by deenergizing the carriage drive motor.

Several problems are encountered in photoelectric based safety sweep systems. One problem is that transmitters from different manufacturers and even from the same manufacturer have variances in their light beam output intensities which must be accounted for in the electronic circuitry. The sensitivity of the receivers also varies substantially. Even transmitters and receivers in a batch obtained under the same model number from the same manufacturer have variations in their characteristics.

Another problem arises from the fact that a photodetector system that works well when it is installed on a carriage having a certain length may not work well on a unit at another installation where the units have a greater length. The problem is inherent in the fact that the beam intensity at the receiver varies in some proportion to the distance between the transmitter and receiver. For example, some mobile storage units may have widths of three or fewer meters while others may be as wide as thirty meters. It is problematical to design a protective system whose sensitivity is so great that it is affected in the same manner by a normal beam intensity and a normal beam intensity plus interfering stray or ambient radiation. As a practical matter, it is desirable for a manufacturer of photoelectric protective systems to only be required to design and have available a few models that are suitable for mobile units having large differences in their widths. Otherwise, it would be necessary for the manufacturer to inventory a variety of protective devices having different electronic circuitry and different transmitter-receiver pairs having infinite sensitivity photoelectric gradations.

The aforementioned and other problems are solved by the new digital photoelectric sweep method and system described herein.

SUMMARY OF THE INVENTION

In accordance with the invention, a photoelectric safety sweep system for mobile storage unit carriages is distinguished by being self-calibrating so as to overcome the aforementioned problems that may arise in such systems. When the system is powered up, an infrared (IR) radiation transmitter, mounted on the aisle side of a mobile storage system is pulsed on and off to project an intermittent beam of IR radiation onto a distant IR receiver that is mounted to the same side of the storage unit as the transmitter. The IR beam projected by the transmitter impinges on a lens built into the receiver. By way of example, and not limitation, when the system is powered up and the calibration procedure is initiated, the width of the first IR pulse sent by the transmitter is narrow such as about equivalent to four microseconds in duration. The output of the IR receiver (R) is monitored continuously. The first and next few of the increasingly wider IR pulses usually do not have sufficient total energy to exceed the sensitivity threshold of the receiver and, hence, the receiver produces no output pulse. During the calibration procedure, the IR pulse width is increased by a predetermined quantity at regular periodicity such as every 20 ms. If the system is in proper working order, a transmitted pulse having enough width and, hence, total energy content to exceed the sensitivity threshold of the receiver will cause the receiver to emit an output pulse. The output pulse is sensed by a microprocessor and its width is stored in memory and becomes the transmitted pulse width used for normal operation of the system. Determining the least IR pulse width, that is, the least energy required to trigger the receiver during calibration, assures that the photodetector components comprised of the transmitter-receiver pair are operating at a level sufficiently greater than the minimum sensitivity or threshold of the pair so that a fairly small object will be sensed and not overlooked.

Since calibration occurs in the environment wherein the mobile storage system is to operate, it will be evident that stray IR or invisible radiation from other mobile units in the range of sight of a receiver or from some other source in the vicinity is automatically taken into account.

If, the calibration procedure as just described results in an output pulse being returned by the receiver, it is reliable evidence that the system is operating properly and will switch to the run mode automatically.

There are, at least, two conditions that manifest a faulted system and that result in the carriage drive motor controllers becoming locked out. One condition is the failure of the IR receiver to return an output signal for any of the calibration IR test pulses within the limits of a predetermined pulse width. In an actual embodiment, by way of example and not limitation, the first IR pulse transmitted to the receiver when the system is first powered up and is in the self-calibrating mode has a width of about 3 microseconds. The pulses are transmitted at a repetition rate of 20 ms. The pulse width is increased by a predetermined quantity every 20 ms. If no pulse signal is returned from the receiver within a total time span of 150 ms, the microprocessor senses this as an indication of a fault existing somewhere in the system and it locks out the controllers for the carriage motors.

A defect in the system and carriage motor lock out is also manifested by the receiver in a transmitter-receiver pair emitting an output pulse near the beginning of the transmitter pulse train when it is known that no energy has been emitted by the transmitter to trigger the receiver to emit an output signal. The microprocessor responds to occurrence of a premature receiver output by causing the carriage drive motor to be inactivated or locked out after doing phase shifting in an attempt to get pulsing out of phase with the sensed energy source.

By way of example, if no pulse signal is returned from the receiver when its threshold energy is surely to have been exceeded, or if a pulse signal is returned when there should not have been one, it could be an indication that one or more components of the system have failed, such as any one of the IR transmitter, IR receiver, logic gates, transistors, buffers, resistors, capacitors or diodes in the new electronic control system.

How the aforementioned objectives and features of the new mobile carriage unit controllers are achieved will be evident in the ensuing more detailed description of the invention which will now be set forth in reference to the drawings.

DESCRIPTION OF THE PREFERRED EMBODIMENT

Figure 1:
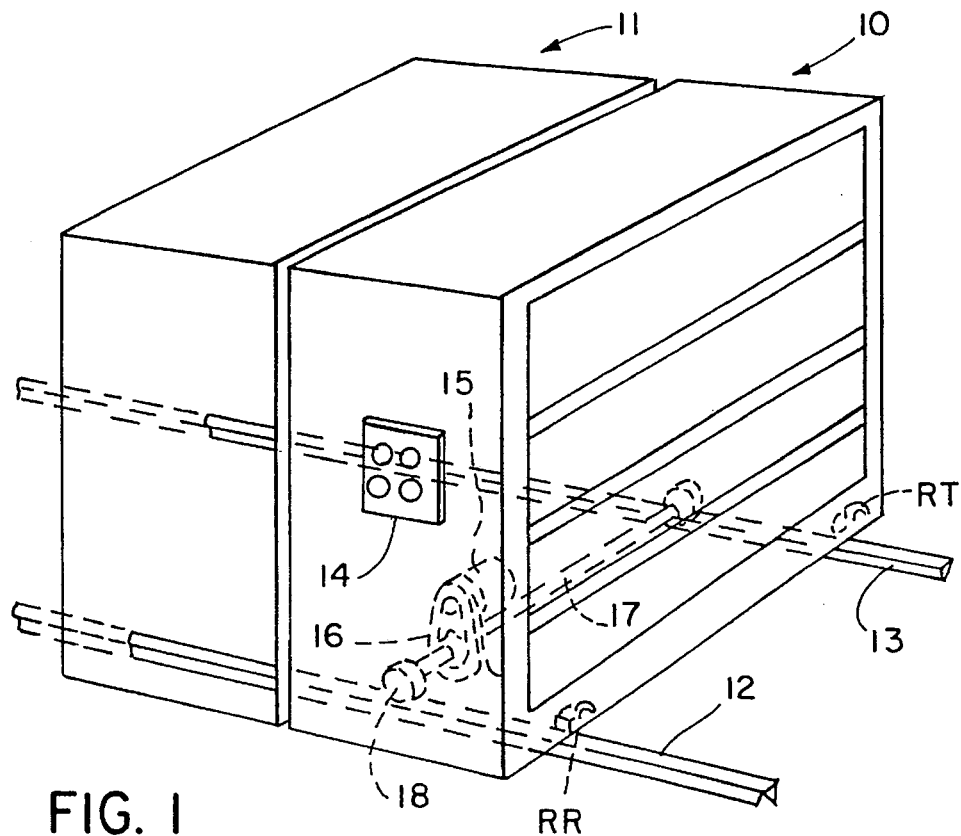
FIG. 1 is a diagrammatic perspective view showing at least one motor driven motor unit adjacent another unit with no aisle having been opened between the units.

FIG. 1 illustrates a mobile storage unit installation comprised of only two storage units marked 10 and 11. At least unit 10 is movable in this installation on tracks 12 and 13. Unit 11 may be either movable or stationary. In most installations, there are several mobile units 10 on tracks 12 and 13 and stationary units at the opposite ends of the tracks at a distance from each other that allows only one open aisle to exist between units. Mounted to one end of unit 10 is a control console 14 on which push buttons and indicator lamps are represented by circles. An appropriate push button on a storage unit next to the place at which it is desired to create an aisle is pressed to cause the storage units to be driven in the proper direction for closing an aisle somewhere in the installation and opening the desired aisle. Opening the aisle allows a person to access the contents of the shelves or bins that are present on the storage units. In FIG. 1, the drive system for the mobile unit 10 is represented diagrammatically by a reversible motor 15, a chain and sprocket drive 16 and a cross shaft 17 that has wheels 18 on opposite ends for running on tracks 12 and 13.

Figure 2:
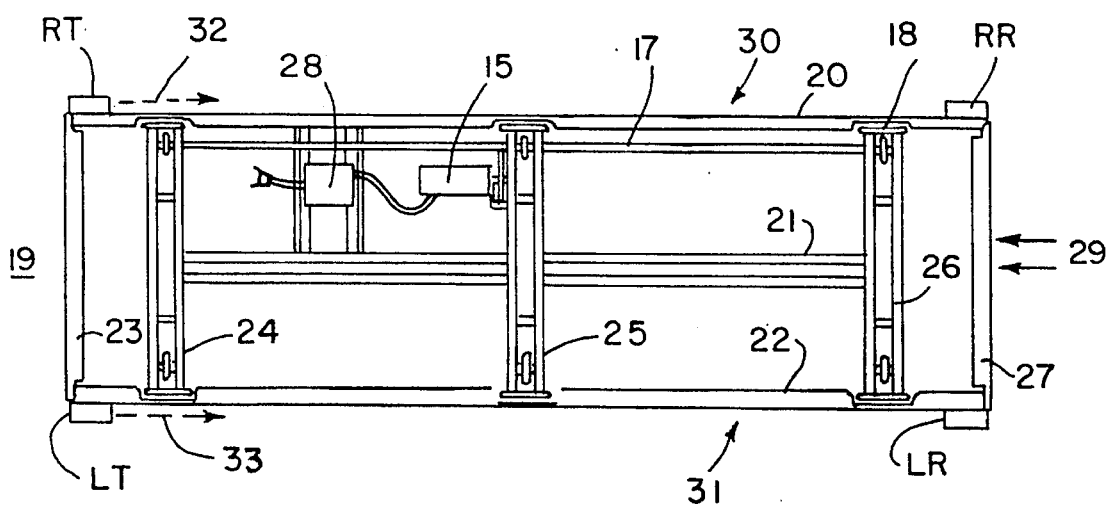
FIG. 2 is a plan view of the carriage on which the storage bins or shelves of the units are mounted for transport on rails.

As shown more realistically in FIG. 2, the shelves or bins of the storage units are mounted on carriages designated generally by the numeral 19. The carriages include a frame comprised of laterally extending members such as those marked 20–22 and longitudinally extending members typified by those marked 23–27. The drive shaft 17 was previously identified as were the carriage wheels 18 and motor 15. A housing 28 is mounted to the carriage and contains various electrical components which are not visible but may include a regulated power supply and logic circuitry that responds to use of the push buttons on console 14 by a person seeking to develop an access aisle between storage units where none exists at the present time. It is of more pertinence to the invention described herein that housing 28 contains electromagnetic relays and contacts that are controlled to energize and deenergize the controller for motor 15 in housing 28 to drive the carriage in one direction or the other for achieving an open aisle.

For the sake of orienting the reader, it is assumed that an observer is looking at the carriage with storage shelves thereon in the direction of the arrows 29 in FIG. 2. Then, the long side of the carriage to the right is designated the right side 30 and the long side to the left is designated the left side 31. The object interference and personnel protective system is a photoelectric based system as opposed to a mechanical sweep bar system. Thus, a right side infrared pulse beam transmitter, RT, and a right side infrared beam photoelectric detector or receiver, RR, are mounted to the carriage at just above the level of the tracks. The pulse IR beam emitted by transmitter RT is suggested by the dashed arrow 32. The transmitter has a focusing or collimating optical system for directing the pulse IR beam emitted by transmitter RI into the optical system of receiver RR on the right side, although the optical components are not visible in FIG. 2.

The left side has a similar transmitter-receiver pair. The left side transmitter is identified by the letters LT, and the left side receiver is identified by the letters LR. The infrared radiation beam is projected as suggested by the dashed line arrow 33. After the system has completed its calibration procedure, any interruption or occlusion of the pulsed infrared transmitted beam will result in a signal being sent to the electronic circuitry which will, in turn, prohibit the carriage motor 15 from running.

IR transmitter and photosensitive receiver pairs are commercially available and are chosen in consideration of the beam intensity and receiver sensitivity needed to obtain reliable object and personnel protection on either long or relatively short-sided mobile carriage units. Allen-Bradley Model 42 SRL-6000 infrared transmitters with an Allen-Bradley Model 42 SRR-6002 receiver had been used successfully in storage unit installations where the distance between the transmitters and receivers is not so great that the intensity of the beam is not great enough to exceed the threshold energy input to the receiver. Other private brand transmitter-receiver pairs are available for those installations where cost is more important than distance.

Figure 3:
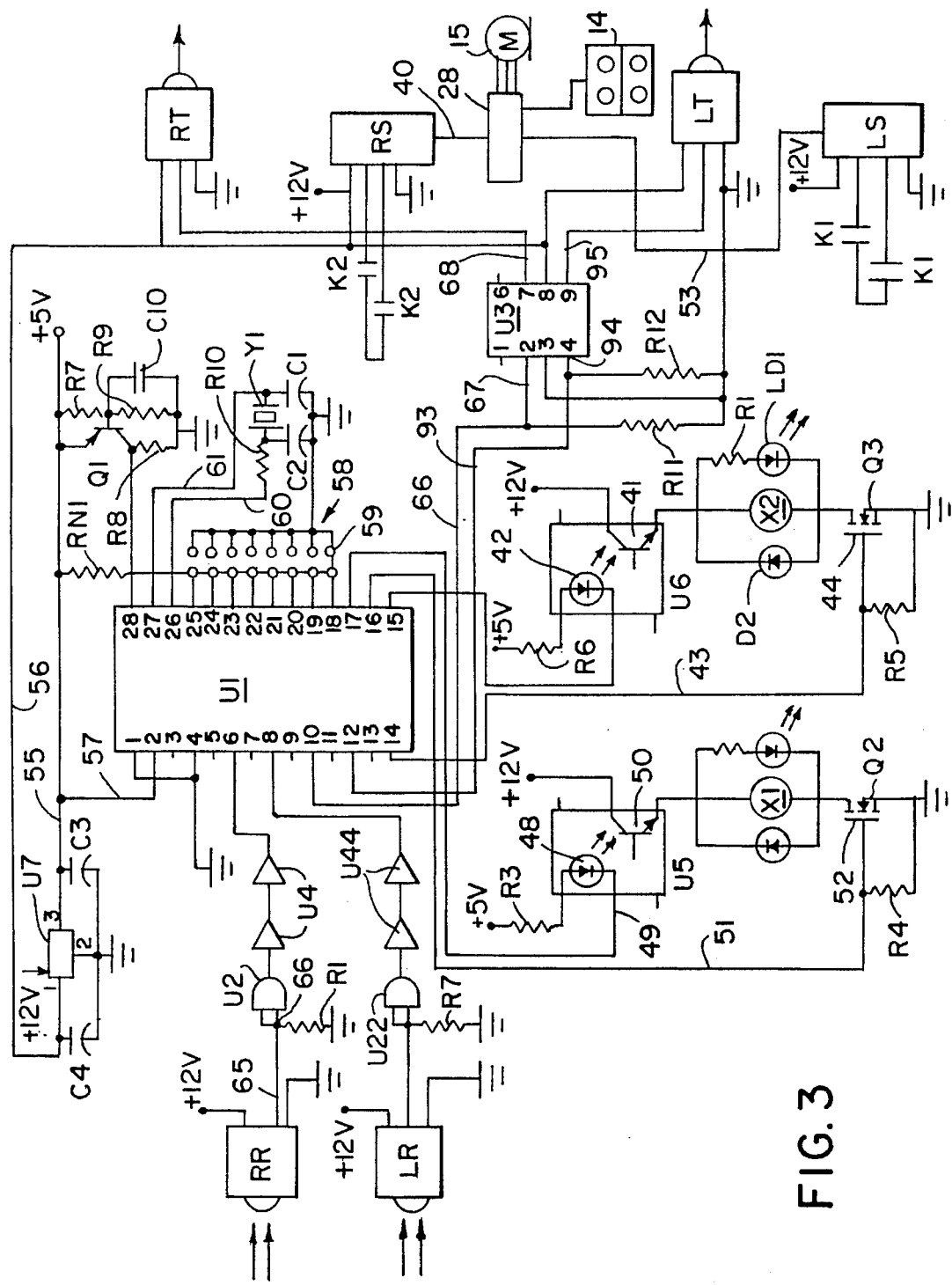
FIG. 3 is a schematic diagram of the principal electrical components of the mobile unit installation protective system.

A microprocessor U1 shown in FIG. 3 governs operation of the protection system. As indicated earlier, if the user wants to open an aisle, a push button on a control console 14 shown in FIG. 1, is depressed and all storage units in the installation move in the proper direction together to cause one aisle to open. There is a contactor in controller housing 28 shown in FIG. 2 that responds to signals transmitted from the FIG. 3 protective system controller by allowing power to be applied to the carriage motor controller so that the carriage motors can run in response to a push button having been depressed, provided, however, that the calibration procedure indicated no fault in the system. The controllers on each storage unit in housings 28 are all electrically interconnected so all motors run at the same time in the appropriate direction in response to a push button having been depressed until movements of the units are limited and an aisle is open. Controls that accomplish this function are known to those who design mobile storage systems.

The left and right side transmitter and receiver pairs LT, LR and RT, RR are involved in the same functions, one of which is to deenergize the carriage drive motor if the pulsed IR beam projected from a transmitter to the receiver is interrupted by a person or interfering object in the opened aisle.

Since the left and right side protection controls are the same, only the right side system involving transmitter RT and receiver RR will be discussed in detail.

Assume for the moment that the calibration integrity tests to be discussed later have been successful, so the carriage motors 15 are permitted to run and move the storage units in a direction that results in an aisle being opened. Since the IR beam between RT and RR is not interrupted by a person or an object, the microprocessor U1 will output signals that enable the carriage motors 15 to run when a push button is pressed. Actually, what happens is, pin 14 on U1 will have switched to a logical high state and pin 15 will have switched to a logical low state as dictated by the program stored in U1. The solid state consequence of this is that the electromagnetic relay coil X2 becomes energized and causes series connected contacts K2 to close. Closing the K2 loop causes relays, not shown, in the right sweep (RS) controller to send an appropriate signal by way of cable 40 to the controller in housing 28 which then allows motor 15 to energize and run in the direction depending on which push button on console 14 was pressed. Actually, the relays and other components of right sweep controller RS can be positioned in housing 28 and are so positioned as implied by the single housing 28 shown in FIG. 2.

It is within the purview of the invention, and those who are skilled in electronic circuitry design will understand that relay coil X2 and contacts K2 could be replaced by solid state semiconductor switching devices for achieving the effect of closing contacts K2.

In FIG. 3, transistor 41 in the optically coupled device U6 is in series with right sweep electromagnetic relay coil X2. Light-emitting diode (LED) 42 in device U6 is connected to a +5 volt source through resistor R6. Hence, if calibration has been successful, as indicated by receiver RR having yielded an output pulse corresponding to every IR input pulse, as will be explained, pin 15 of microprocessor U1 switches to a logical low voltage state, LED 42 conducts and biases transistor 41 of the optically coupled device U6 to a conductive state. The current path begins at the 5 volt source and extends through R6, LED 42 to pin 15 of microprocessor U1. However, energization of relay coil X2 requires that field transistor (FET) Q3 also be conductive. Thus, when pin 15 switched to a low logical state, pin 14 of the microprocessor U1 switched to a high logical state. Current then flowed from pin 14 of microprocessor U1 through line 43 and resistor R5 to ground. The resulting voltage drop across R5 is applied to the gate electrode 44 of FET Q3, thereby switching the FET to a conductive state whereupon relay coil X2 is energized since current can now flow from the +12 v source.

A series circuit comprised of resistor R1 and an LED marked LD1 is connected in parallel with relay coil X2 for the LED to indicate when and if there is power on electromagnetic relay coil X2. This can be useful for troubleshooting if occasion arises. A diode D2 also in parallel with coil X2 provides a low impedance path for reverse current flow that occurs when the magnetic field of coil X2 collapses incidental to deenergization of coil X2 as is a well-known phenomena. The left side protective sweep motor power circuit is similar to the right side circuit just described so only a little more than identification of the parts will be undertaken. In this case, LED 48 of an optically coupled device U5 has resistance R3 connected to a logic level 5 volt source. A line 49 connects the cathode of LED 48 to pin 17 of microprocessor U1. When pin 17 switches to a logical low voltage state, as it does when the calibration procedure indicates no fault in the system, LED 48 conducts and biases transistor switch 50 of optically coupled device U5 to a conductive state. When pin 16 of microprocessor U1 switches to a high logical voltage state as it will do if calibration is successful, current flows from pin 16 of microprocessor U1 by way of line 51 through resistor R4. The voltage drop on R4 is applied to gate 52 of FET Q2 and it conducts thereby permitting current flow through electromagnetic relay coil X1. Energization of relay coil X1 results in series connected contacts K1 of the relay closing so relays, not shown, in sweep circuitry LS to close. The consequence is that relays, not visible in housing 28, are able to close by way of power supplied to cable 53. The reversible carriage motor 15 of the storage unit will then run provided a push button on console 14 is pressed to effect opening of a selected aisle. Again, relay coil X1 and contacts K1 could be replaced with semi-conductor components.

The upper left region of FIG. 3 depicts a conventional integrated circuit voltage regulator U7 in a circuit with filter capacitors C3 and C4. One output line 55 is the source of regulated voltage, particularly 5 volts for various digital logic devices in the FIG. 3 circuitry. The other output line 56 is the source of regulated voltage, particularly twelve volts, used in the circuitry. 5 volts is supplied to microprocessor U1 by way of line 57.

Pins 18–25 of microprocessor U1 are connected in common and to a 5 volt source line 55 through a pull up resistor network RN1. A series of commonly connected grounded pins 58 may be connected to any of pins 18–25 by means of jumpers such as the one marked 59 to effect certain functions that will be elaborated later.

A crystal oscillator comprised of crystal Y1, capacitors C1 and C2 and resistor R2 has its output lines 60 and 61 connected to pins 26 and 27 of microprocessor U1. The oscillator serves as the timing clock for the microprocessor. In the illustrative embodiment, an 8 bit microprocessor U1, type 16C57 made by Microchip is used although other 8 bit microprocessors could be used. The clock pulse rate is 4 MHz in this case. The identified microprocessor may be more versatile and powerful than necessary for the particular application so another state-of-the-art commercially available microprocessor may be substituted in future production.

Because microprocessor U1 functions most reliably when its supply voltage is close to 5 volts and no less than 4.5 volts, a voltage sensing circuit is provided. It is depicted in the upper part of FIG. 3 and comprises a voltage divider including series connected resistors R7 and R9, capacitor 10, collector resistor R8 and transistor Q1. There is always a voltage drop across R7 at any line 55 logic voltage to forward bias the emitter-base circuit of Q1, so as to cause it to conduct. Transistor Q1 acts as a switch. The current magnitude through R8 which Q1 regulates, that is, the voltage drop across R8 depends on how hard Q1 is driven by the bias voltage across R7. If the voltage drop across resistor R8 is high enough to correspond to the proper nominally 5 volts on line 55, this is sensed at pin 28 of microprocessor U1 which responds by becoming enabled.

Now to be discussed is how the protection circuit depicted in FIG. 3 accomplishes auto calibration and switching to a run mode or a lock out mode depending on whether calibration is successful, that is, indicates no fault in the system, or there is a fault. Consider first the functionality of the protective sweep on the right side of mobile unit 10 which employs infrared transmitter RT and infrared receiver RR. When the circuit is powered up, the right side infrared beam transmitter RT begins to emit IR pulses at a constant repetition rate of, for example, 20 ms periodicity in an actual embodiment. The characteristics and timing of the transmitted pulses will be discussed shortly hereafter. However, during the calibration mode, the pulses are increased in width as time goes on until a predetermined limit is reached. The IR beam pulses emitted by the right transmitter, RT, in FIG. 3 at this time impinge on receiver RR. The first of the pulses in the calibration sequence have a narrow pulse width and thus are unlikely to contain insufficient total energy to provoke an output pulse signal from receiver RR on the storage unit. Expressed in another way, the narrow width pulses have insufficient total energy to exceed the sensitivity threshold of receiver RR. Since during the calibration procedure, the transmitted IR pulses are successively increased by a predetermined amount in width, a pulse width will normally be attained which has sufficient width to exceed the sensitivity threshold of receiver RR and the receiver will output pulse signals corresponding to that pulse on line 65. The output pulses from receiver RR are input to an AND gate U2 shown in the upper left region of the FIG. 3. AND gate U2 has its inputs connected to a resistor R1 which is grounded. The combination of the AND gate U2 and buffers U4 serves as a level shifter in that it converts the nominally 12 volt pulse output signals from receiver RR to a logic voltage level of 5 volts for input to pin 6 of microprocessor U1.

The 20 ms delayed but increasingly wider infrared pulses transmitted by RT correspond to pulses that are output from pin 10 of microprocessor of U1. These pulses have a 5 volt digital logic amplitude. They are conducted by way of line 66, through resistor R11 across which a voltage drop develops that is applied to input line 67 of a driver and signal level changer U3. Driver U3 raises the 5 volt logic voltage input signals to 12 volt output signals and transmits them on line 68 to right side infrared transmitter RT for the pulses to drive the transmitter.

As implied earlier, the only circumstance under which increasingly widened transmitted IR pulses will evoke output pulses from the right side receiver RR, now under consideration, is when all components of the system are functioning properly and the transmitted pulse widths exceed the sensitivity threshold of the receiver. If, during calibration, proper conditions are met, the system goes into the run mode. The width of the transmitted IR pulse that evoked the first output signal pulse from the receiver RR is stored in the memory aboard processor U1. As explained earlier, this means that the microprocessor U1 will emit constant signals from pins 14 and 15 for causing optically coupled transistor 41 and FET Q3 to conduct for energizing electromagnetic relay coil X2 and permit the carriage motor to run. As explained, energization of relay coil X2 causes closure of contacts K2 and closure of contacts, not shown, in sweep device RS which results in putting controller 28 in readiness state for turning on carriage drive motor 15 if a push button in console 14 is pressed to request driving a mobile storage unit 10 in the proper direction to open an aisle. As mentioned earlier, semiconductor switching devices, not shown, could the relays and contacts X2 and K1, respectively.

Figure 4:
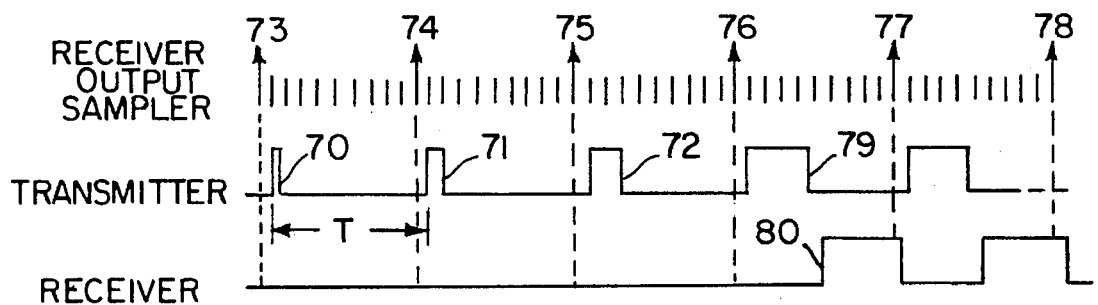
FIGS. 4, 5 and 6 are timing diagrams that are useful for facilitating a description of the functional features of the protective system.

The calibration and run or lock out method will be elucidated further in reference to the FIG. 4 timing diagram. As alluded to earlier, as soon as the system is powered up, the right and left side transmitters RT and LT initiate the series of successively widening infrared radiation pulses labelled "Transmitter" in FIG. 4. The first transmitted pulse 70 has a basic width of a few microseconds, and the second pulse 71 is a multiple of, such as twice as wide as the first. The third pulse 72 is three times as wide as the first, and so on. The microprocessor is programmed to emit the pulse signals for driving the transmitter RT, for example, that results in transmitter RT emitting infrared pulses of substantially corresponding width. The rising or leading edges of the pulses occur during the post calibration run mode at constant periodicity which, by way of example and not limitation, may be every 20 ms. Also, for the sake of example, the first pulse 70 width or duration may be about 4 microseconds and then an increase in the width by a fixed predetermined incremental quantity goes on from there. Note, in this illustration, that at least during the time span of the first three pulses 70–72 no return pulse such as the pulse marked 80 has been emitted by the receiver RT. This means that there is no pulse signal that is input to AND gate U2 as yet. The microprocessor is continuously monitoring output line 65 of receiver RR for a signal indicative of the width of the increasingly wider IR pulse having sufficient energy for causing the receiver to produce an output electric signal pulse. As indicated by the line labeled "Receiver Output Sampling" in FIG. 4, a pre-pulse test is made by the microprocessor just before the beginning of transmission of an IR pulse at the 20 ms time intervals as indicated by the sampling pulses marked 73–77. The test for a received pulse is made at least about one clock pulse before each IR pulse is transmitted. In this example, none of the first three transmitted pulses 70–72 exceeded the sensitivity threshold of receiver RR so there was no pulse signal emitted from the receiver at output line 65 of receiver RR. The pre-pulse sample taken at time 73 finds no pulse signal from the receiver RT so there is no change of state at output pins 14 and 15 of microprocessor U1 that would result in enabling the carriage motor to run in response to a push button being depressed.

In the FIG. 4 example, the transmitted IR pulse 79 among the increasingly wider pulse series has enough width and total energy to exceed the sensitivity threshold of receiver RR, so it produces an output signal on output line 65 of receiver RR which is input to AND gate U2 and buffers U4 which output a signal at the digital logic voltage level of 5 volts to input pin 6 of microprocessor U1. The microprocessor stores the width of the first transmitted IR pulse that is energetic enough to evoke an output pulse signal 80 from the receiver in response to the IR input pulse 79. The microprocessor stores the pulse width 80 in terms of the number of clock pulses within its envelope. The microprocessor also recognizes that this is the minimum transmitted IR pulse that will excite the receiver RR to issue signals representing pulse signals from the receiver and continue to transmit pulses of the width of pulse 79 that will cause output pulses 80 from the receiver. As long as the system is powered up and no obstruction interrupts the pulsed IR beam projected by transmitter RT to receiver RR, IR pulses having the width of pulse 79 will be transmitted and electric pulse signals having the width of pulse 80 will be emitted from the receiver RR so that motor controller 28 is enabled for responding to an aisle opening request having been made as a result of a push button having been depressed in console 14.

The calibration procedure followed by a run mode as just described is representative of what happens if the calibration procedure establishes that the system is in good working condition. If, receiver RR returns a pulse signal in response to having just received the narrowest width transmitted pulses 70 or 71, there would have to be a fault in the system since the narrowest of the transmitted infrared pulses do not have sufficient energy to exceed the threshold level of the receiver RR. Having a return pulse signal be detected on insufficient transmitted IR impulse energy could be caused by any of a faulty transmitter RT, receiver RR, gate U2 or a buffer U4, for example. In this situation, output pins 14 and 15 of microprocessor U1 would not experience a change of state, so the relay coil X2 would not be energized nor would the motor controller in housing 28 be in a state of readiness for turning on carriage drive motor 15 when a push button is pressed to obtain an aisle opening. The microprocessor is programmed so that it will not allow pins 14 and 15 to change state until the fault is diagnosed and corrected. Existence of a fault in the system can also be indicated during the calibration procedure by no output pulse signal being emitted by the receiver, even though the transmitted pulse width should be adequate to provoke the receiver RR to issue a pulse signal indicative of having received a transmitted IR pulse. The microprocessor is programmed so that if it does not receive, an output pulse signal from receiver RR within a predetermined time after the increasingly wide infrared pulses are transmitted, such as within 150 ms, the microprocessor will prohibit the change of state on its output pins 14 and 15 that is necessary to allow relay coil X2 to be energized. Hence, carriage motor 15 cannot run until the fault is diagnosed and corrected.

The lack of any output pulse from the receiver within a long interval such as 150 ms when infrared pulses are being transmitted suggests that the transmitter may be faulty due possibly to the infrared emitting diode, not shown in the transmitter, having failed. The infrared photodetector in the receiver could also have failed, or there could be faulty electronics in the receiver. Of course, the lack of any returned pulse signal to input pin 6 of microprocessor U1 could also indicate a fault in other components of the system.

Figure 5:
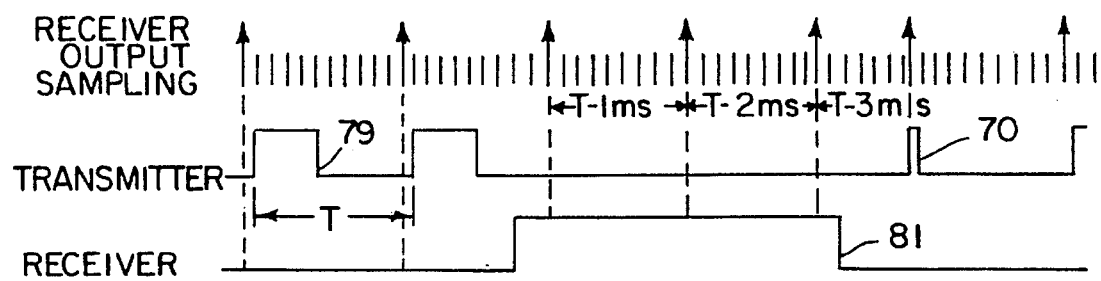

Attention is now invited to FIG. 5 for a more detailed discussion of what happens when a return pulse signal is output from receiver RR during a calibration attempt or normal run, that is not the result of the transmitter performance. In FIG. 5, the earliest in the sequence of infrared pulses transmitted by RT are marked 70 and 71 as they are in FIG. 4. The pre-pulse samplings 73–78 are also given the same numerals. At the pre-pulse sampling instant 75, a returned pulse signal 81 has occurred but should not have since transmitted pulse 71 is still too narrow for evoking an output pulse signal 81 from the receiver. A premature pulse 81 could be the result of circuit failure or high ambient infrared radiation from sources such as another photoelectric pair in the vicinity of the mobile units, or even from intensive natural or incandescent lamp radiation or circuit failures affecting receiver RR. When the premature returned pulse signal is detected during the calibration procedure, according to the invention, the transmitted infrared pulses are inhibited by the microprocessor. The microprocessor still makes a check for pre-pulse sampling at instants 73 and so on. But, the microprocessor goes into a phase shifting mode wherein the successive pre-pulse sampling intervals, equal to T are shorter than the normal T=20 ms intervals. As indicated in FIG. 5 by T-1mrs and so on, the successive intervals are shortened by 1 ms per interval. In the FIG. 5 example, when the pre-pulses beyond the pre-pulse mark 75 are made, there is still a spurious high signal 81 being outputted from the receiver because of ambient infrared interference. When and if the end of the spurious high pulse is sensed during one of the pre-pulse sampling instants, such as the one marked 78, a basic T=20 ms transmitted pulse time interval is allowed to expire and after that transmitter RT is turned on again. When turned on, RT begins issuing the narrowest transmitted IR pulses such as 70 and 71 again and increases the width of each in succession as was the case during the successful calibration procedure previously described in reference to FIG. 4.

If the fault due to ambient radiation clears, recalibration continues until minimum threshold sensitivity of the receiver RR is reached so it yields an output pulse signal. The process described in reference to FIG. 5 is invoked automatically when, during calibration, ambient interfering infrared radiation is present temporarily or indefinitely and it is desired to keep the system locked out. The system always comes up locked out until calibration is successful for a given mobile unit side. After the calibration process in FIG. 4 shows that the system is in proper operating condition, a shift to a polling mode or, in other words, the run mode is made.

Figure 6:
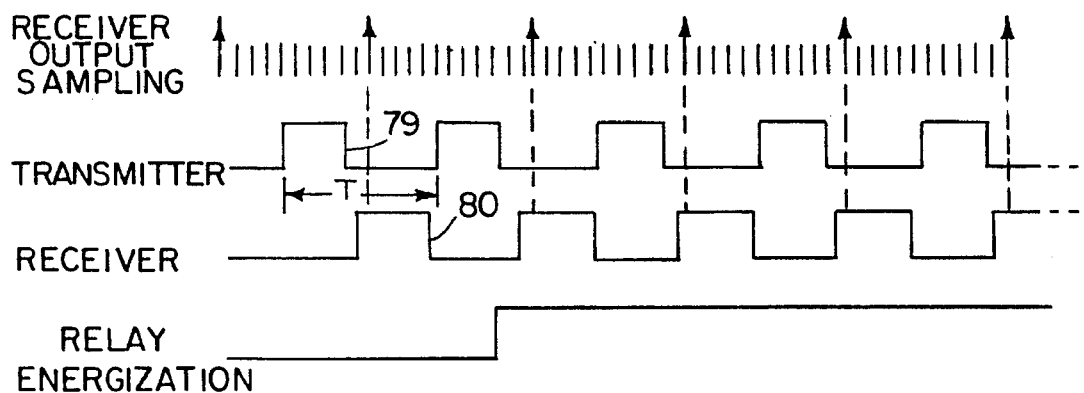

Events occurring during the normal running mode are illustrated in FIG. 6. In this case, the microprocessor has stored the data representing the transmitted pulse width that evoked the first receiver pulse output signal during calibration. The microprocessor uses that pulse width in the run mode. The time interval T between the leading edges of the transmitted infrared pulses is constant and, as mentioned earlier, the value of T might be 20 ms, for example, but T is not restricted to that value.

In FIG. 6, the equivalent of the first evoked or receiver output signal pulse that occurred during calibration is marked 80 as it is in FIG. 4. The transmitted infrared pulses are marked 79 since, as just explained, it was the pulse marked 79 in FIG. 4 that evoked the first output signal 80 from the receiver during the calibration procedure. As one would expect, in FIG. 6, during the run mode all of the receiver RR output pulses have the same width because that is the width stored in the microprocessor. During the run mode, the receiver output is continuously sampled to assure that the receiver is emitting an output pulse signal for every infrared pulse that is received. The series of output pulses from the receiver are input to pin 10 of microprocessor U1. The microprocessor processes a signal and, as long as there are output pulse signals from the receiver that correspond to infrared input pulses, the microprocessor holds the state of its output pins 14 and 15 at logical voltage levels that result in relay coil X2 being energized constantly.

If, during the normal run mode just described in reference to FIG. 6, the receiver RR output should happen to be at a high logical state while a pre-pulse sample is being taken, the microprocessor begins the minus 1 ms phase shift every 20 ms ten times over a total of 200 ms. A high logical state could be the consequence of stray infrared radiation impinging on the receiver-photodetector or some other circuit fault. After phase shifts equal to ½ T, or 180 degrees, have occurred without the untimely high logical state disappearing, the computer causes energization of relay coil X2 to be prohibited, and the system is locked out until interfering IR radiation or a circuit fault is corrected.

The calibration and the run modes pertaining to the right side of the mobile storage unit 10 have now been described. The right side IR transmitter RT, and the right side photodetector or receiver RR were involved. A transmitter LT and a receiver LR are mounted to the left side of the mobile storage unit since protection against the consequences of an object or person being in an open aisle when a mobile unit is moving to the left is also needed. Because the left and right side functions are symmetrical, there is no need to describe the left side functions.

It is sufficient to point out that when the left side photosensor or receiver LR emits, in response to receiving an above threshold transmitted pulse, an output pulse that undergoes a 12 volt to 5 volt level reduction by the combination of AND gate U22 and buffers U44. The 5 volt digital logic signal is input to pin 8 of the microprocessor. If a successful calibration run is made, similar to FIG. 4, the microprocessor output signals from its pins 16 and 17 which result in relay coil X1 becoming energized, thereby enabling carriage motor 15 to run. If, during calibration, an output pulse from the left receiver is emitted prematurely, that is, emitted when the transmitted pulses have insufficient energy to cause an output pulse signal to be emitted to the left side receiver, the microprocessor responds by inhibiting energization of relay coil X1 as was the case with the right side system as has been discussed. Also, if there is no output pulse signal from the receiver LR within a predetermined time, such as 150 ms after the first transmitted pulse, energization of coil X1 is inhibited so the motor 15 cannot run.

The left side transmitter LT is excited to emit infrared pulses by pulse signals issuing from pin 12 of the microprocessor. These are logical level signals which are conducted by line 99 through R13. The resulting voltage drop across R12 is applied to an input of the voltage level changer or driver U3. The corresponding output signal on line 95 running from driver U3 is increased to a higher level, such as 12 volts for driving left transmitter LT.

The microprocessor is programmed so that during the calibration and run procedures, it causes testing the right side and left side photoelectric transmitter and receiver pairs alternately. In other words, the right side transmitter RT and the left side transmitter LT transmit test pulses are slightly out of phase with each other. This reduces the peak current draw from a dc power supply in housing 28 as compared with having transmitters LT and RT triggered at the same instant such that peak current would be the sum of the currents drawn by the left and right side circuitry. The advantage of this is that a power supply having a lower rating and lower cost can be used than would otherwise be possible.

All of the pins 18–25 of the microprocessor that are not shown with jumpers connecting them to ground by way of the common connections 58, are normally at a high logical level during operation of the protection system. Connecting a jumper such as the one marked 59 from a pin to ground affects the program stored in the microprocessor. The one jumper that is connected for illustrative purposes may let the microprocessor know that an infrared transmitter-receiver pair adopted for use in a particular case has some unusual characteristics requiring the transmitter pulse rate or pulse width to have certain values. Another jumper might be used to tell the microprocessor to cause higher transmitter pulse rates when the system is used on mobile units that have lengths that are 12 or more meters long where deflection or bending of the mobile storage units must be accounted for.

If, when the system is in the run or polling mode, the transmitted and infrared pulsed beam is interrupted by a person in an open aisle or an object in the aisle when another person has pushed a button to open a different aisle, the carriage motors are disabled automatically. Interruption of the infrared beam causes instant discontinuation of output pulses by the right or left receiver, RR or RT, that is involved. The microprocessor in an instant responds by changing the logical signal states of pins 16 and 17 or 14 and 15 so one or the other of the relay coils X1 or X2 is deenergized and contacts K1 or K2 open. There can be a minor drop out time delay before the relay contacts open after the coils are deenergized, even if relays having less than state-of-the-art drop our time are used, it is likely they will drop out in one-eighth of a second which is satisfactory for reenergization delay.

Although a preferred embodiment of the invention has been described in detail, such description is intended to be illustrative rather than limiting, for the invention may be variously embodied and is to be limited only by interpretation of the claims which follow.

What is claimed is:

1. A self-calibrating photodetector protection system comprising:

a radiation beam transmitter having an input for electric driving pulses and operative to project a beam of radiation pulses corresponding substantially in width to the width of the driving pulses, a radiation receiver spaced from the transmitter and arranged for receiving the pulsed radiation beam, the receiver having an output and is adapted to respond to receiving radiation pulses of a minimum width and greater than a minimum width by issuing from its output electric pulses corresponding substantially to the width of the received radiation pulses, a digital processor having an electric pulse output coupled to the input of the transmitter and having an input coupled to the output of the receiver, the processor responding to an initializing signal by functioning in a calibration mode wherein the processor is operative to output a series of electric pulses to the input of the transmitter, the first corresponding radiation pulse output in the series by a properly operative transmitter having a preset minimum width and following pulses having successively greater widths up to a predetermined limit to determine the least pulse width in the series that has sufficient width to exceed the pulse width sensitivity threshold of the receiver, which if exceeded, will cause a properly operating receiver to output an electric pulse signal to said input of the processor, said processor having an output and responding to said input of electric pulses by changing the logic level voltage state of said last named output.

2. The protection system according to claim 1 wherein said radiation is infrared radiation.

3. The protection system according to claim 1 including a digital memory in said processor in which data representative of the width of said minimum width pulse is stored, said processor responding to storing said width by switching to a run mode wherein the driving pulses that are output to the input of the transmitter are controlled by the processor to have a width corresponding to the stored narrowest pulse in the series that caused the receiver to output said electric pulse signal.

4. The protection system according to claim 1 wherein:

the voltage level of the transmitter driving pulses output of said processor is a digital logic level voltage, said system including a voltage level changing digital driver having an input coupled to said output of the processor for receiving said digital logic voltage level driving signals and having an output coupled to said input of the receiver, said driver operative to increase the voltage level for driving the transmitter.

5. The protection system according to claim 1 wherein the electric pulses that are output from said receiver having a voltage level above the digital logic voltage level, and said system includes a voltage level reducing circuit having an input coupled to the output of the receiver for receiving said electric pulses from the receiver and having an output coupled to said input of the processor, said voltage level reducing circuit comprising a gate having an input constituting said input to the circuit and having an output, and buffers in succession connected between the gate and the input to said processor.

6. The protection system according to any one of claims 1, 2 or 3 including:

a contactor device comprised of an electromagnet coil and an electrical load circuit containing contacts that close in response to energizing said coil, an optically coupled device including an LED proximate to a light responsive transistor that is in a series circuit including the coil and a dc voltage source, the source voltage being higher than the digital logic voltage, the LED connected to an output of the processor and the; processor responding to having received said electric pulse signal from the receiver by applying a logic level voltage to said LED for switching the transistor of the device to a conductive state, a transistor switch connected in said series circuit with the dc voltage source and coil and having a control electrode coupled to an output of the processor for applying a logic voltage to the control electrode concurrently with said processor receiving said electric pulse signal from the receiver to cause the switching transistor to conduct to energize the coil and close said contacts in the load circuit.

7. A protection system according to claim 6 and a mobile storage system:

the mobile storage system comprised of at least one reversibly driven carriage and a storage structure mounted on the carriage for the carriage and structure to form a bidirectionally movable unit, another structure in the path of movement of movable unit, the unit being movable toward the structure and away form the structure for creating an aisle between the unit and structure, said protection system carried on said movable unit and said transmitter and receiver mounted spaced apart from each other on the unit for the radiation beam to extend along the unit on a side facing the aisle, reversible electric motor mounted to the movable unit and operatively coupled to said unit for driving said unit when energized, motor controller mounted to the movable unit and electrically connected to the motor, said controller being in a circuit with said contacts and an electric power source, said controller becoming energized and enabled to run the motor in one direction or another only if said radiation beam is not interrupted, said processor is receiving said electric pulse signals from the receiver, and said contacts are closed.

8. A protection system according to claim 1 wherein the delay between electric output signals in the series output by the processor is about 20 ms.

9. Mobile storage apparatus and a self calibrating photoelectric protective system therefor, comprising:

at least one movable unit movable in at least one direction and comprised of a carriage having wheels and a storage structure mounted to the carriage, an electric motor mounted to the carriage and operatively coupled to the wheels for moving the movable unit, a transmitter of an infrared radiation beam mounted to said movable unit and a receiver of said beam mounted to said unit in spaced relation to the transmitter to provide for preventing the unit from moving when the beam is interrupted, the transmitter having an input for electric pulse signals and is adapted for emitting a beam of infrared radiation pulses having a pulse width or duration corresponding substantially to the width or duration of the input electric pulse signals, the receiver having an input for the infrared radiation pulses and an output for electric pulse signals, the receiver is adapted to output electric pulse signals corresponding substantially to the width or duration of the input infrared radiation pulses provided the input infrared radiation pulses have sufficient width to equal or exceed the sensitivity threshold of the receiver, a digital processor having a plurality of inputs and outputs including an electric pulse output coupled to said input of the infrared beam transmitter and having an input coupled to the electric pulse output of the receiver, the processor responding to an initializing signal by functioning in a calibration mode wherein the processor is operative to output a series of electric pulse signals to the input of the transmitter, the first corresponding infrared radiation output pulse from a properly operating transmitter having a preset minimum width and following pulses having successively greater widths to determine the pulse width in the series that has at least sufficient width to exceed the pulse width sensitivity threshold of the receiver, which if exceeded, causes a properly operating receiver to output an electric pulse signal to said input of the processor, the processor responding to receiving the electric pulse signal by providing control signals at an output of the processor, a motor controller aboard said movable storage unit having input means, said motor controller responding to input of a signal representative of a control signal from the processor by becoming enabled to energize said motor for moving the mobile unit.

10. Mobile storage apparatus according to claim 9 further defining a circuit for providing said signal to an input of the motor controller, comprising:

a relay including an operating electromagnet coil and contacts that close for the motor controller to become enabled if the coil is energized a light emitting diode (LED) connected to a logic level dc voltage source and to an output of said processor and including a transistor proximate the LED in a series circuit including a higher than logic level dc voltage source and a switching transistor that has a control electrode connected to an output of the processor, said processor changing the logic voltage states of the outputs of the processor to which said LED and control electrode are connected in response to said processor receiving said electric pulse signal from the transmitter to cause the LED to turn on, the transistor to conduct, and the switching transistor to conduct to energize said coil and close the contacts.

11. Mobile storage apparatus according to any one of claims 9 or 10 including a digital memory on board said processor, the processor storing data representative of said electric pulse signal that is input from said receiver and said processor then switching to a run mode wherein the electric pulse signals output from the processor to the transmitter and the infrared radiation pulses from the receiver are maintained at a width corresponding to the width of the pulse in the memory of the processor.

12. Mobile storage apparatus according to any one of claims 9 or 10 wherein the time delay between the beginning of each electric pulse signal from the processor in said series to the transmitter is constant and said processor takes a sample of its input from the receiver before each infrared radiation pulse in the series is transmitted to determine if there is a subsisting electric output pulse from the receiver resulting from the last infrared radiation pulse that was transmitted.

13. Mobile storage apparatus according to claim 12 wherein said delay between electric pulse signals is at least about 20 ms.

14. A method of preventing a motor driven carriage from colliding with a person or object, comprising:

having an infrared (IR) beam pulse transmitter and an IR pulse receiver mounted on the carriage with the transmitter aimed at the receiver, initiating a calibration mode by generating under control of a computer electric pulses at constant periodicity but successively increasing width and applying the electric pulses to the transmitter to cause it to project IR pulses having corresponding periodicity and width to identify the minimum IR pulse width that has sufficient energy to evoke a first corresponding electric pulse output from the IR receiver, storing in memory data representative of the width of the minimum pulse if one is identified and switching to a run mode wherein electric signals are produced under control of the computer for enabling the motor to be energized, continuing to project said pulses of minimum width to maintain the run mode.

15. The method according to claim 14 including the steps of:

responding to the failure of an evoked pulse to occur after a predetermined time or number of pulse intervals during the calibration mode by blocking signals for enabling energization of the motor.

16. The method according to claim 14 wherein:

interrupting said IR pulse beam projected to the receiver is detected under control of the computer, and having the computer respond to IR beam interruption having been detected by causing output of signals for enabling the motor to be discontinued.

17. The method according to claim 14 including:

having the computer control sampling to determine if an electric pulse signal is returned from the IR receiver when no IR pulse has been transmitted yet to the receiver to begin an interval, and if a pulse signal is returned during the instant of sampling, inhibiting further transmission of IR pulses to thereby prevent enabling of the motor.

18. The method according to claim 14 operating to compensate when the IR receiver is exposed to stray ambient IR radiation including:

sampling immediately before the instant each IR pulse that begins each constant interval should occur to determine if a signal is returned from the IR receiver and if said signal is returned before an IR pulse that begins an interval is transmitted to the receiver, having the computer programmed to respond to pulses returned from the receiver that are not provoked by the IR pulse transmitter by decreasing the length of the time interval between the instants of sampling, continuously sensing if the returned unprovoked pulse is extended and if and when the end of the pulse is sensed allowing a time interval corresponding to the aforementioned constant intervals during which IR pulses are projected to expire, and then controlling the IR transmitter to begin projecting IR pulses of increasing length again to repeat the calibration procedure.

* * * * *